Figure 1:
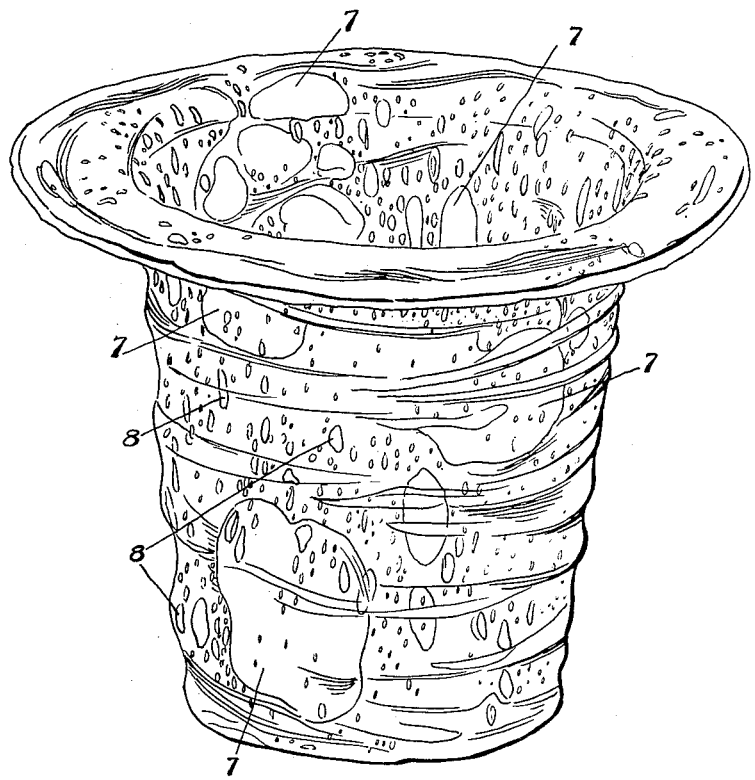

July 28, 1931.   R. HALEY   1,816,045
BUBBLED COLORED GLASS ARTICLES
Filed Oct. 7, 1927   2 Sheets-Sheet 1

July 28, 1931.  R. HALEY  1,816,045
BUBBLED COLORED GLASS ARTICLES
Filed Oct. 7, 1927   2 Sheets-Sheet 2

INVENTOR
Reuben Haley
By Green and McCallister
His Attorneys.

Patented July 28, 1931

1,816,045

UNITED STATES PATENT OFFICE

REUBEN HALEY, OF BEAVER, PENNSYLVANIA

BUBBLED COLORED GLASS ARTICLES

Application filed October 7, 1927. Serial No. 224,660.

This invention relates to glass articles and more particularly to blown glass articles and a method of making the same.

An object of this invention is to provide a method of making blown glassware in various colors.

Glass articles made in accordance with this invention can either be of a solid color or the major part thereof can be of one color or crystal with splotches or designs therein of one or more colors, and if desired, bubbles or blisters can be provided in the ware in the manner described in Patent No. 1,715,130 filed by me on Oct. 7, 1927 and granted on May 28, 1929.

In making a blown glass article in accordance with this invention, I first gather a small ball of molten glass on the end of a blowpipe. This can be any type of glass and of any color. It is preferable to use crystal glass and the ball which I gather should contain about one half the quantity required to make the finished article.

This ball is blocked to make it round and true and is blown sufficiently to form the same into a core.

I then take finely divided colored glass and sift the same onto the ball so that at least portions thereof are coated with the colored glass. This colored glass because of the heat in the molten or partially molten core tends to adhere thereto. After the core is coated or partially coated, I encase the same with molten glass and I preferably use glass from the same pot or tank from which the first gather is made. I do this by gathering over the ball in its wholly or partially coated condition an amount of molten glass sufficient to encase the same and to form with the first gather a combined or duplex gather from which the finished article can be made. The duplex gather with the colored glass between the several layers thereof is then blown and otherwise manipulated into the form of the article desired. This may either be manipulated by hand or blown in a mold as is now common.

The finely divided colored glass is preferably of uniform size so that it may be deposited on the core by means of a sieve.

If it is desired to apply the colors in designs, the colored glass may be sifted onto the core through stencils so as to apply the colored glass in designs such as rings, stripes, dots, etc., or as crude flowers.

The heat retained in the core is sufficient to cause the particles of colored glass to adhere thereto with sufficient tenacity to allow a gather to be made over the core and the colored glass.

I have obtained highly decorative effects by utilizing crystal glass, in coating portions of this with colored glass, in encasing this with crystal glass and then in blowing the duplex gather to form hollow glass articles.

The finely divided colored glass fuses with the layers of the duplex gather and forms splotches of color in the finished ware. These splotches produce a highly decorative article.

In some cases, I find it desirable to combine the invention of this application with that of my other said application. In order to obtain the combined effects of these two inventions, I deposit on the core in addition to the finely divided colored glass, blister or bubble forming material which as said in said other application, may be soda ash, salt or almost any material which will throw off a small amount of gas when subjected to the heat of the combined gathers. Blisters or bubbles formed in this manner in many cases enhance the beauty of the articles colored as in the manner above set forth. When the bubble forming material is thus applied to the inner core at the same time that the finely divided colored glass particles are applied thereto, the gases will be generated at the same time that the colored particles are fusing into the mass, with the result that the spreading of the bubbles will distort the colored glass particles into fantastic shapes, thus giving the article an unusually pleasing and artistic appearance.

Figure 3:
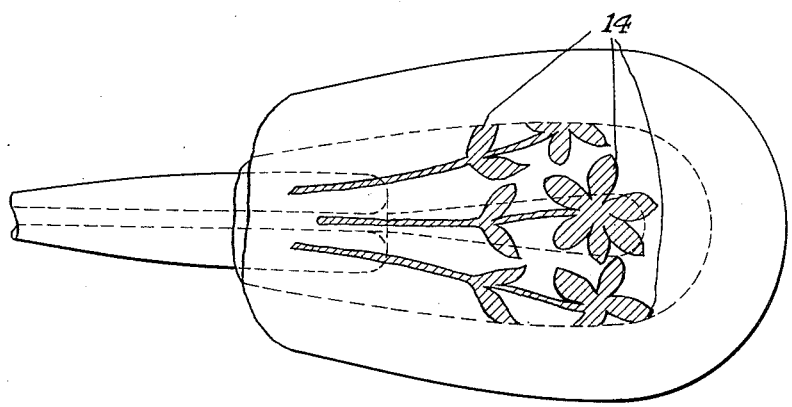
Figure 2:
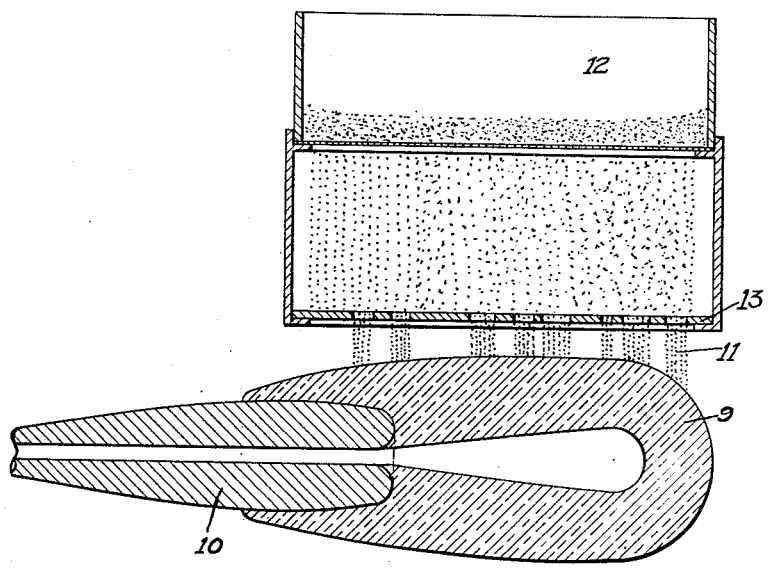

Figure 1 illustrates in perspective a blown glass vase in which the method of this application and that of said other application are combined. The splotches of color are designated by 7 and the blisters or bubbles by 8. Figure 2 diagrammatically illustrates one of the steps utilized in carrying out this method and in this view 9 represents the ball or core which has been gathered on the end of blowpipe 10 and blocked to give it a round form. Finely divided colored glass 11 is shown in the act of being deposited onto the core from a sieve bottomed box 12 through a stencil 13. Figure 3 represents a duplex gather on the end of a blowpipe with a design 14 in colored glass deposited on the inner gather or core.

What I claim is:—

1. The method of making a glass article, which consists in gathering a core of molten glass, in depositing thereon finely divided bubble-forming material and finely divided colored glass, then in gathering an additional amount of molten glass over said core and then in blowing the combined gather to form the article.

2. The method of making a glass article, which consists in gathering a core of molten glass, in causing finely divided bubble forming material and finely divided colored glass to adhere thereto, then in gathering an additional amount of molten glass over said core and then blowing the combined gather to form the article whereby the gases forming the bubbles will be generated at the same time that the pieces of colored glass are fusing into the mass, for the purpose set forth.

In testimony whereof, I have hereunto subscribed my name this 26th day of September, 1927.

REUBEN HALEY.